US006407174B1

(12) United States Patent
Ouhadi

(10) Patent No.: US 6,407,174 B1
(45) Date of Patent: Jun. 18, 2002

(54) PROPYLENE/ETHYLENE/α-OLEFIN TERPOLYMER THERMOPLASTIC ELASTOMER VULCANIZATES

(75) Inventor: Trazollah Ouhadi, Liege (BE)

(73) Assignee: Advanced Elastomer Systems, L.P., Akron, OH (US)

( * ) Notice: Subject to any disclaimer, the term of this patent is extended or adjusted under 35 U.S.C. 154(b) by 0 days.

(21) Appl. No.: 09/576,682

(22) Filed: May 23, 2000

Related U.S. Application Data

(63) Continuation-in-part of application No. 09/078,379, filed on May 13, 1998, now abandoned.

(30) Foreign Application Priority Data

Jul. 4, 1997 (EP) ............................................. 97111257

(51) Int. Cl.⁷ ......................... C08L 23/16; C08L 23/10; C08L 21/00
(52) U.S. Cl. ....................... 525/192; 525/194; 525/197; 525/198; 525/100; 525/103; 525/104; 525/105; 525/106; 525/133; 524/424; 524/425; 524/444; 524/506; 524/508; 524/515; 524/518; 524/519; 524/521; 524/525
(58) Field of Search ................................. 525/192, 194, 525/197, 198, 133, 100, 103, 104, 105, 106; 524/424, 425, 444, 506, 508, 515, 518, 519, 521, 525

(56) References Cited

U.S. PATENT DOCUMENTS 5,100,947 A * 3/1992 Puydak et al. ............... 525/192
5,157,081 A * 10/1992 Puydak et al. ............... 525/237

FOREIGN PATENT DOCUMENTS

DE 3033671 * 3/1981

* cited by examiner

*Primary Examiner*—D. R. Wilson
(74) *Attorney, Agent, or Firm*—William A. Skinner

(57) ABSTRACT

The present invention relates to a thermoplastic elastomer vulcanizate obtained from a thermoplastic propylene/ethylene/α-olefin terpolymer, a rubber component and optional additives, by dynamic vulcanization of the rubber component with a non-peroxide curing system. The vulcanizate has both superior physical properties and excellent processability.

7 Claims, No Drawings

PROPYLENE/ETHYLENE/α-OLEFIN TERPOLYMER THERMOPLASTIC ELASTOMER VULCANIZATES

CROSS REFERENCE TO RELATED APPLICATION

This application is a continuation in part of application Ser. No. 09/078,379 filed May 13,1998, now abandoned.

BACKGROUND OF THE INVENTION

1. Field of the Invention

The present invention relates to thermoplastic elastomer vulcanizates (TPV) having superior physical properties and excellent processability comprising a blend (alloy) of a thermoplastic component and a fully vulcanized rubber component. The present invention further relates to a method for preparing said thermoplastic vulcanizate under dynamic vulcanization conditions.

2. Background/Prior Art

Polymer blends which have a combination of both thermoplastic and elastic properties (thermoplastic elastomers, TPE) are generally obtained by blending a thermoplastic polyolefin with an elastomeric composition (rubber) in a way such that the elastomer in intimately and uniformly dispersed as a discrete particulate phase within a continuous phase of the thermoplastic. Early work with vulcanized compositions is found in U.S. Pat. No. 3,037,954 which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition (vulcanizate or dynamically vulcanized alloy, DVA) is a microgel dispersion of cured elastomer, such as butyl rubber, chlorinated butyl rubber, polybutadiene or polyisobutene in an uncured matrix of thermoplastic polymer such as polypropylene. Since then the technology has advanced significantly.

U.S. Pat. No. 3,037,954 discloses compositions comprising polypropylene and a rubber such as, inter alia, butyl rubber, chlorinated butyl rubber, polybutadiene, polychloroprene and polyisobutene. Compositions of about 50 to 95 parts polypropylene and about 5 to 50 parts of rubber are disclosed.

U.S. Pat. No. 3,758,643 and U.S. Pat. No. 3,806,558 disclose polymer blends comprising an olefin thermoplastic resin and an olefin copolymer rubber wherein the rubber is dynamically cured to a partial cure state. The compositions can be reprocessed, however, the potential applications of such blends are limited by their high compression set and/or low softening temperature resulting from only a partial cure of the rubber. Furthermore, the partial peroxide cure utilized in such blends is difficult to control from the standpoint of completeness of reaction, resulting in batch to batch variations in product properties.

U.S. Pat. No. 4,639,487 is directed to heat shrinkable DVAs including an ethylene copolymer resin blended with a butyl or halogenated butyl rubber. The butyl rubber should be at least partially dynamically vulcanized to a cured state in the presence of the copolymer.

U.S. Pat. No. 4,212,787 is directed to the production of partially cured DVA compositions which include 40–100 wt. % of a peroxide curable copolymer (such as EPDM); 0–60 wt. % of a peroxide decomposing copolymer (such as PE and PP); and 5–100 wt. % of a peroxide non-curable rubber, either polyisobutylene or butyl rubber.

U.S. Pat. No. 4,202,801 relates to the partial dynamic curing of a blend of a monoolefin copolymer rubber, such as saturated EPM or EPDM; a polyolefin resin such as PP or PE, with a conjugated diene rubber such as polybutadiene or polychloroprene. Crystalline polyolefin resin may be used. More than one monoolefin copolymer rubber, conjugated diene rubber and polyolefin resin may be used in combination. The DVAs of this invention are said to provide low compression set and high tensile strength at elevated temperatures.

U.S. Pat. No. 4,480,074 discloses DVA compositions said to exhibit improved surface characteristics and fabricability wherein the compositions are prepared by blending an unvulcanized, but vulcanizable, monoolefin rubber with a blend containing cured polyolefin rubber with crystalline polyolefin and subsequently vulcanizing such that the final blend comprises about 15–45 parts by weight of crystalline polyolefin and 85–55 parts by weight of vulcanized rubber. EPDM is taught as both the vulcanized polyolefin rubber and the unvulcanized but vulcanizable rubber in the disclosed blends.

JP-A-85,530/87 discloses a DVA composition including a crystalline polypropylene as a matrix and two elastomers: a bromobutyl rubber and an olefin copolymer rubber such as EPM or EPOM rubber.

The thermoplastic elastomer vulcanizates known in the art, however, show limitations with respect to the balance of physical properties (tensile strength, elongation at break) and processability, i.e., allowing to obtain shaped articles after injection-molding, extrusion and blow-molding which show no defect, such as on the surface, at the edges, etc.

It is an object of the present invention to provide a thermoplastic elastomer vulcanizate which has an improved balance of physical properties and superior processability. Additionally, it is desirable to provide thermoplastic elastomer vulcanizates allowing formulations with a high mineral filler content while maintaining a good balance of physical properties and an excellent processability.

DESCRIPTION OF THE INVENTION

It has surprisingly been found according to the present invention that thermoplastic vulcanizates obtained from a terpolymer comprising propylene, ethylene and an α-olefin containing at least 4 carbon atoms as the thermoplastic component and a vulcanizable rubber as the elastomer component has both, superior physical properties and superior processability compared to thermoplastic elastomer vulcanizates based on homopolypropylene and reactor copolymer polypropylene (blend of polypropylene/ ethylene-propylene copolymer rubber made in the polymerization reactor) as the thermoplastic component.

In detail the present invention relates to a thermoplastic elastomer vulcanizatce comprising (a) 10 to 75% by weight of at least one thermoplastic terpolymer of ethylene propylene and an (α-olefin containing at least 4 carbon atoms, (b) 90 to 25% by weight of at least one fully cured rubber component, based on the total weight of components (a)+(b), and optionally (c) 0 to 70% by weight of additive(s), based on the total weight of components (a)+(b)+(c).

Preferably the thermoplastic elastomer vulcanizate (dynamically vulcanized rubber/plastic alloy ("DVA")) comprises 15 to 70% by weight of the thermoplastic terpolymer (a), 85 to 30% by weight of the fully cured rubber component (b), based on the total weight of components (a)+(b), and up to 65% by weight of the additive(s) (c), based on the total weight of components (a)+(b)+(c). The range defined above for the amount of the rubber (b) is based on the pure rubber component, excluding any extending oil which may be contained in the rubber.

In the specification and the claims the term "thermoplastic terpolymer" may be used interchangeably for "thermoplastic polyolefin" or just "polyolefin". The term "rubber" may be used interchangeably for "elastomer". The term "vulcanizate" in terms of the present invention means a blend or alloy which is obtainable from a thermoplastic olefinic polymer and a curable elastomer by melt-blending them in the presence of a curative to dynamically vulcanize the elastomer. The resulting DVA is a polyolefin matrix having micron or submicron size cured elastomer particles dispersed therein.

Thermoplastic Terpolymer

The terpolymer may have a random distribution in structure or a multi-sequence (multi-block) structure.

The thermoplastic terpolymer (a) consists of 0.5 to 19.5% by weight, more preferably from 2.0 to 15.0% by weight of ethylene monomer, 80.0 to 99.0% by weight, preferably from 96.0 to 80.0% by weight of propylene monomer and 19.5 to 0.5% by weight, preferably from 2.0 to 15.0% by weight of the α-olefin monomer containing at least 4 carbon atoms, based on the weight of the thermoplastic terpolymer (a).

The α-olefin monomer used in the preparation of the terpolymer (a) is a monoolefin and preferably contains 4 to 12 carbon atoms, more preferably from 4 to 8 carbon atoms. As the α-olefin 1-butene, 1-pentene, 1-hexene and 1-octene are preferred. Most preferably 1-butene, 1-hexene and 1-octene are used as the α-olefin. Blends of thermoplastic terpolymers (a) can be used as well.

The preparation of said thermoplastic terpolymers (a) mentioned above is conventional in the art and known to the skilled person. Reference is made to the Ziegler/Natta catalysis-type or metallocene-catalysis-type polymerization.

Rubber Component

The curable elastomers (b) suitable for use in the composition of the invention are compatible with the thermoplastic olefin component (a) or may be compatibilized. Suitable monoolefinic copolymer rubbers (elastomers) comprise non-polar, rubbery copolymers of two or more α-monoolefins, preferably copolymerized with at least one polymer, usually a diene. Saturated monoolefin copolymer rubber, for example ethylene-propylene copolymer rubber (EPM) can be used. However, unsaturated monoolefin rubber such as EPDM rubber is more suitable. EPDM is a terpolymer of ethylene, propylene and a non-conjugated diene. Satisfactory non-conjugated dienes include 5-ethylidene-2-norbornene (ENB); 1,4-hexadiene; 5-methylene-2-norbornene (MNB); 5-vinyl norbornene (VNB); 1,6-octadiene; 5-methyl-1,4-hexadiene; 3,7-dimethyl-1,6-octadiene; 1,3-cyclopentadiene; 1,4-cyclohexadiene and dicyclopentadiene (DCPD).

Butyl rubbers are also useful in the compositions of the invention. As used in the specification and claims, the term "butyl rubber" includes copolymers of an isoolefin and a conjugated monoolefin, terpolymers of an isoolefin and a conjugated monoolefin, terpolymers of an isoolefin with or without a conjugated monoolefin, divinyl aromatic monomers and the halogenated derivatives (halogenated butyl rubber) of such copolymers and terpolymers.

The useful butyl rubber copolymers comprise a major portion of isoolefin and a minor amount, usually less than about 30 wt %, of a conjugated multiolefin. The preferred copolymers comprise about 85–99.5 wt % of a $C_{4-7}$ isoolefin such as isobutylene and 15–0.5 wt % of a multiolefin of 4 to 14 carbon atoms, such as isoprene, butadiene, dimethyl butadiene and piperylene. Commercial butyl rubber, chlorobutyl rubber, bromobutyl rubber, useful in the invention, are copolymers of isobutylene and minor amounts of isoprene with less than about 3% halogen for the halobutyl-derivatives. Other butyl co- and terpolymer rubbers are illustrated by the description in U.S. Pat. No. 5,916,180.

Another suitable copolymer within the scope of the olefinic rubber of the present invention is a copolymer of a $C_{4-7}$ isomonoolefin and a para-$C_{1-8}$-alkylstyrene, and preferably a halogenated derivative thereof. The amount of halogen in the copolymer, predominantly in the para-alkylstyrene, is from about 0.1 to about 10 wt %. A preferred example is the brominated copolymer of isobutylene and para-methylstyrene. These copolymers are more fully described in U.S. Pat. No. 5,162,445.

A further olefinic rubber suitable in the invention is natural rubber. The main constituent of natural rubber is the linear polymer cis-1,4-polyisoprene. It is normally commercially available in the form of smoked sheets and crepe. Synthetic polyisoprene can also be used. Furthermore, polybutadiene rubber and styrene-butadiene-copolymer rubbers can also be used.

Blends of any of the above olefinic rubbers can be employed, rather than a single olefinic rubber.

Further suitable rubbers are nitrile rubbers. Examples of the nitrile group-containing rubber include a copolymer rubber comprising an ethylenically unsaturated nitrile compound and a conjugated diene. Further, the copolymer rubber may be one in which the conjugated diene units of the copolymer rubber are hydrogenated.

Specific examples of the ethylenically unsaturated nitrile compound includes acrylonitrile, α-chloroacrylonitrile, α-fluoroacrylonitrile and methacrylonitrile. Among them, acrylonitrile is particularly preferable.

Examples of the conjugated diene include 1,3-butadiene, 2-chlorobutadiene and 2-methyl-1,3-butadiene (isoprene). Among them, butadiene is particularly preferred. Especially preferred nitrile rubbers comprise copolymers of 1,3-butadiene and about 10 to about 50 percent of acrylonitrile.

Another suitable rubber in terms of the present invention are based on polychloroprene rubber. These rubbers are commercially available under the trade names Neoprene® and Bayprene®.

Additives

In addition to its polymer component, the DVA composition of this invention can include as additive (c) reinforcing and non-reinforcing fillers, antioxidants, stabilizers, rubber processing oils, rubber/thermoplastic phase compatibilizing agents, lubricants (e.g., oleamide), anti-blocking agents, antistatic agents, waxes, coupling agents for the fillers and/or pigment, foaming agents, pigments, flame retardants, and other processing aids known to the rubber compounding art. The pigments and fillers can comprise up to 50 wt % of the total DVA composition, based on polymer components (a)+(b) plus additives (c); preferably pigments and fillers comprise about up to 40 wt % of the total composition. The total amount of additives, including pigments and fillers, may be up to 70 wt %, based on the total composition (a)+(b)+(c).

Fillers can be inorganic fillers such as calcium carbonate, clays, silica, talc, titanium dioxide or carbon black. Any type of carbon black can be used, such as channel blacks, furnace blacks, thermal blacks, acetylene black, lamp black and the like.

Rubber process oils have particular ASTM designations depending on whether they fall into the class of paraffinic, naphthenic or aromatic process oils. They are derived from petroleum fractions. The type of process oil utilized will be that customarily used in conjunction with the rubber component. The ordinarily skilled rubber chemist will recognize which type of oil should be utilized with a particular rubber. The quantity of rubber process oil utilized is based on the total rubber content, both cured and uncured, and can be defined as the ratio, by weight, of process oil to the total rubber in the DVA. This ratio can vary from about 0 to about 4/1; preferably about 0.4/1 to about 3.5/1; more preferably about 0.8/1 to about 3.2/1. Larger amounts of process oil can be used, the resultant effect being reduced physical strength of the composition. Oils other than petroleum based oils, such as oils derived from coal tar and pine tar, can also be utilized. In addition to the petroleum derived rubber process oils, organic esters and other synthetic plasticizers can be used.

The ratio of the process oil defined above includes the extending oil which may be contained in rubber plus additional oil added during the manufacture of the thermoplastic elastomer.

Antioxidants can be utilized in the composition of this invention. The particular antioxidant utilized will depend on the rubbers utilized and more than one type may be required. Their proper selection is well within the ordinary skill of the rubber and thermoplastic processing chemist. Antioxidants will generally fall into the class of chemical protectors or physical protectors.

Physical protectors are used where there is to be little movement in the part to be manufactured from the composition. The physical antioxidants include mixed petroleum waxes and microcrystalline waxes. These generally waxy materials impart a "bloom" to the surface of the rubber part and form a protective coating to shield the part from oxygen, ozone, etc.

The chemical protectors generally fall into three chemical groups; secondary amines, phenolics and phosphites. Illustrative, non-limiting examples of types of antioxidants useful in the practice of this invention are hindered phenols, amino phenols, hydroquinones, alkyidiamines, amine condensation products, etc. Further non-limiting examples of these and other types of antioxidants are styrenated phenol; 2,2'-methylene-bis(4-methyl-6-t-butylphenol); 2,6'-di-t-butyl-o-di-methylamino-p-cresol; hydroquinone monobenzyl ether, octylated diphenyl amine; phenyl-beta-naphthylamine; N,N'-diphenylethylene diamine; aldol-alpha-naphthylamine; N,N'-diphenyl-p-phenylene diamine, etc.

Curing System

In the composition of the invention, only the elastomer component of the DVA will be vulcanized, or crosslinked. Those ordinarily skilled in the art will appreciate the appropriate quantities, types of cure systems and vulcanization conditions required to carry out the vulcanization of the rubber. The elastomer can be vulcanized using varying amounts of curative, varying temperatures and varying time of cure in order to obtain the full crosslinking desired. Known cure systems can be used, so long as they are suitable under the vulcanization conditions for the elastomers being used and are compatible with the thermoplastic polyolefin component. It is not desirable to use a cure system which crosslinks or degrades the thermoplastic terpolymer. Therefore the peroxide-based systems, which are known to cause chain fragmentation of polypropylene and crosslinking of polyethylene, are not suitable for use in the invention.

Suitable curatives include metal oxides, resin systems, maleimides, high energy radiation and the like, both with and without accelerators and coagents. Another curing system which can be used is the hydrosilylation system which consists of a silicon hydride curative catalyzed with a platinum or rhodium derivative. Such systems are disclosed, for instance, in EP-A-0776937.

Phenolic resin curatives are preferred for the preparation of the DVA composition of the invention, and such cure systems are well known in the art and literature of vulcanization of elastomers. Their use in DVA compositions is more fully described in U.S. Pat. No. 4,311,628.

A basic ingredient of such a system is a phenolic curing resin made by condensation of halogen substituted phenol, $C_1$–$C_{10}$ alkyl substituted phenol or unsubstituted phenol with an aldehyde, preferably formaldehyde, in an alkaline medium or by condensation of bifunctional phenoldialcohols. Dimethylol phenols substituted in the para-position with $C_5$–$C_{10}$ alkyl groups are preferred. Halogenated alkyl substituted phenol curing resins prepared by halogenation of alkyl substituted phenol curing resin are also especially suitable. Phenolic curative systems comprising methylol phenolic resins, halogen donor and metal compound are especially recommended, details of which are described in Giller, U.S. Pat. No. 3,287,440 and Gerstin et al, U.S. Pat. No. 3,709,840. Non-halogenated phenol curing resins are used in conjunction with halogen donors, preferably, along with a hydrogen halide scavenger. Ordinarily, halogenated, preferably brominated, phenolic resins containing 2–10 weight percent bromine, do not require halogen donor but are used in conjunction with a hydrogen halide scavenger such as metal oxides such as iron oxide, titanium oxide, magnesium oxide, magnesium silicate, silicon dioxide and preferably zinc oxide, the presence of which promotes the cross-linking function of the phenolic resin, however, with rubbers which do not readily cure with phenolic resins, the conjoint use of a halogen donor and zinc oxide is recommended. The preparation of halogenated phenol resins and their use in a curative system with zinc oxide are described in U.S. Pat. Nos. 2,972,600 and 3,093,613, the disclosure of which along with the disclosure of the aforesaid Giller and Gerstin patents are incorporated herein by reference. Examples of suitable halogen donors are stannous chloride, ferric chloride, or halogen donating polymers such as chlorinated paraffin, chlorinated polyethylene, chlorosulfonated polyethylene, and polychlorobutadiene (neoprene rubber). The term "activator" as used herein means any material which materially increases the cross-linking efficiency of the phenolic curing resin and includes metal oxides and halogen donors either used alone or conjointly. For further details of phenolic curative systems see "Vulcanization and Vulcanizing Agents," W. Hoffman, Palmerton Publishing Company. Suitable phenolic curing resins and brominated phenolic curing resins are commercially available, for example, such resins may be purchased under the trade names SP-1045, CRJ-352, SP-1055 and SP-1056 from Schenectady Chemicals, Inc. Similar functionally equivalent phenolic curing resins may be obtained from other suppliers. As explained above, sufficient quantities of curatives are used to achieve essentially complete cure of the rubber.

Usually 5 to 20 weight parts of the curative or curative system are used per 100 weight parts of the rubber to be cured.

General Procedure

The olefin rubber component of the thermoplastic elastomer vulcanizate is generally present as small, i.e., micro-size, particles within a continuous polyolefin (thermoplastic terpolymer) matrix, although a co-continuous morphology is also possible depending on the amount of rubber relative to plastic with or without rubber curing, and the cure system or if the rubber is cured, the degree of cure of the rubber. The rubber is fully crosslinked/cured. Furthermore, blends of these different types of rubbers can be employed.

The full crosslinking can be achieved by adding an appropriate rubber curative or curative system to the blend of thermoplastic terpolymer and the rubber and vulcanizing the rubber to the desired degree under conventional vulcanizing conditions. However, it is preferred that the rubber be crosslinked by the process of dynamic vulcanization. As used in the specification and claims, the term dynamic vulcanizations means a vulcanization or curng process for a rubber contained in a thermoplastic elastomer composition, wherein the curable rubber is vulcanized under conditions of high shear at a temperature above the melting point of the thermoplastic polyolefin component. The rubber is thus simultaneously crosslinked and dispersed as fine particles within the polyolefin matrix, although as noted above, other morphologies may also exist. Dynamic vulcanization is effected by mixing the thermoplastic elastomer components at elevated temperature in the presence of a rubber curative in conventional mixing equipment such as roll mills, Banbury mixers, Brabender mixers, continuous mixers, mixing extruders such as single and twin-screw extruders and the like. Thereby the dynamically (fully) vulcanized rubber/plastic alloy (DVA) is obtained. The unique characteristic of dynamically cured compositions is that, notwithstanding the fact that the rubber component is fully cured, the compositions can be processed and reprocessed by conventional plastic processing techniques such as extrusion, injection molding and compression molding. Scrap or flashing can be salvaged and reprocessed.

Preferably, after the thermoplastic terpolymer and rubber are intimately mixed, the curative is added. Heating and masticating at vulcanization temperatures are generally adequate to complete the vulcanization reaction in a few minutes or less, but if shorter vulcanization times are desired, higher temperatures may be used. A suitable range of vulcanization temperature is from about the melting temperature of the thermoplastic terpolymer, i.e. between 120° C. to about 250° C. or more. Typically, the range is from about 150° C. to about 225° C. A preferred range of vulcanization temperatures is from about 180° C. to about 220° C. To obtain thermoplastic elastomer vulcanizates, it is important that mixing continues without interruption until vulcanization occurs. Mixing is continued until a maximum mixing torque indicates that vulcanization has occurred. The vulcanized composition then can further be processed as mentioned above.

The term "fully vulcanized" as used herein means that the rubber component to be vulcanized has been cured to a state in which the elastomeric properties of the crosslinked rubber are similar to those of the rubber in its conventional vulcanized state, apart from the thermoplastic elastomer composition. Simply stated, fully vulcanized means that all of the rubber component which is capable of being vulcanized, has been vulcanized (cured). The degree of cure can be described in terms of gel content or conversely, extractable components. This is generally understood to mean that no more than about four percent, and preferably less than about two percent, by weight of the cured rubber is extractable at room temperature by a solvent which dissolves the rubber which is intended to be vulcanized. The degree of cure may also be expressed in terms of crosslink density. All of these descriptions are well known in the art, for example in U.S. Pat. Nos. 5,100,947 and 5,157,081, the disclosures of which are fully incorporated herein by this reference.

The modified thermoplastic elastomer vulcanizate of the present invention is used in processes for making shaped articles by conventional processing such as co-injection, co-extrusion, blow molding, co-blow molding (injection and extrusion), lamination, calendering, overmolding by injection and compression, and over-extrusion.

The invention will be better understood by reference to the following examples which serve to illustrate but not limit the present invention.

Unless otherwise indicated throughout this invention weight parts or % by weight are used to characterize the compositions.

EXAMPLES

1. Materials

| | |
|---|---|
| Adsyl 5C30F: | random terpolymer obtained by Ziegler/Natta catalysis containing 3.3 wt % $C_2$, 90.7 wt % $C_3$ and 6.0 wt % $C_4$, melt flow index (230° C., 2.16 kg load) = 5.5 dg/min |
| Eltex PRS 210: | reactor copolymer polypropylene with 8 to 9 wt % ethylene and a melt flow index (230° C., 2.16 kg load) = 6.0 dg/min (Solvay) |
| PP HA 125J: | Homopropylene, melt flow index (230° C., 2.16 kg load) = 0.8 dg/min (Borealis) |
| PP HF 135M: | Homopropylene, melt flow index (230° C., 2.16 kg load) = 18 dg/min (Borealis) |
| Omya white PRP: | anhydrous aluminum silicate (calcinated kaolin clay) (Omya) |
| Sunpar 150: | mineral process oil (Sun Petroleum Products) |
| MDV 91/7: | EPDM rubber with an ethylene content of 68.1 wt %, and an ENB content of 4.4 wt %. Mooney Viscosity ML (1 + 4) at 125° C. = 70, containing 75 parts by weight of process oil per 100 parts of rubber |
| SP 1045: | alkyl phenol formaldehyde resin (Schenectady) |
| Omya BL: | calcium carbonate (Omya) |
| PP 4045: | polypropylene carbon black master batch (40 wt % carbon black) (Cabot Plastic) |

2. The following measurement standards were used

| | |
|---|---|
| Hardness: | ISO 868-85 |
| Modulus: | DIN 53 405 |
| Elongation: | DIN 53 405 |
| Tensile Strength: | DIN 53 405 |
| Tear: | DIN 53 507 |
| Compression set: | ISO 815-B |

3. The following typical procedure was used in carrying out the examples of this invention:

Into a 3 l Banbury internal mixer maintained at 160° C. the rubber, thermoplastic and ZnO, $SnCl_2$ and filler are added and mixed for about 3 minutes keeping the temperature at about 180 to 200° C. One third of process oil is added while continuing mixing for about another minute. Then the second third of the process oil is added while continuing to mix for another minute. Then the curative (phenolic resin) is added. After about 3 minutes of mixing the last third of the process oil is added. The mixed formulation was then discharged after two minutes of the last addition from the mixer and passed through a cold roll-mill to make a sheet. The sheet was ground into flakes and the flakes were subsequently used for making plaques by injection-molding.

TABLE 1

Comparative Physical Properties

| Blend | Example 1 (Reference) (wt %) | Example 2 (Invention) (wt %) | Example 3 (Reference) (wt %) |
|---|---|---|---|
| Adsyl 5C30F | — | 14 | — |
| Eltex PRS 210 | — | — | 14 |
| PP HA 125J | 12 | — | — |
| PP HF 135 M | 2 | — | — |
| Omya white PRP | 15 | 15 | 15 |
| Sunpar 150 | 17 | 17 | 17 |
| MDV 91/7 | 51.85 | 51.85 | 51.85 |
| ZnO | 0.6 | 0.6 | 0.6 |
| $SnCl_2$ | 0.35 | 0.35 | 0.35 |
| SP 1045 | 1.2 | 1.2 | 1.2 |
| Hardness (15", SH A) (ISO) | 67 | 62 | 63 |
| Direction ⊥ to flow | | | |
| Mod. 100 (MPa) | 2.9 | 2.4 | 2.3 |
| Mod. 300 (MPa) | 5.1 | 4.0 | 4.2 |
| Elongation (%) | 437 | 586 | 512 |
| Tensile (MPa) | 6.9 | 8.4 | 6.8 |
| Direction // to flow | | | |
| Mod. 100 (MPa) | 3.8 | 2.6 | 2.8 |
| Mod. 300 (Mpa) | — | 4.3 | 4.8 |
| Elongation (%) | 238 | 464 | 363 |
| Tensile (Mpa) | 5.1 | 5.8 | 5.3 |
| Tear (N/mm) | | | |
| Direction ⊥ to flow | 16.5 | 14.2 | 14.7 |
| Direction // to flow | 14.2 | 13.9 | 13.2 |
| Compression set | | | |
| RT | 14 | 15 | 15 |
| 70° C. | 22 | 24 | 24 |
| 100° C. | 25 | 28 | 26 |

TABLE 2

Physical Properties of TPV with random terpolymer PP as thermoplastic component

| Blend | Example 4 (Invention) (wt %) |
|---|---|
| Adsyl 5C30F | 14 |
| $CaCO_3$; Omya BL | — |
| Clay, Omya white | 21 |
| Sunpar 150 | 20 |
| DMV 91/7 | 42.65 |
| PP 4045 | 0.5 |
| ZnO | 0.6 |
| $SnCl_2$ | 0.35 |
| SP 1045 | 0.9 |
| Hardness (15", Sh A) (ISO) | 64 |
| Direction ⊥ to flow | |
| Mod. 100 (MPa) | 3.4 |
| Mod. 300 (MPa) | 5.8 |
| Elongation (%) | 610 |
| Tensile (MPa) | 9.4 |
| Direction // to flow | |
| Mod. 100 (MPa) | 3.6 |
| Mod. 300 (MPa) | 6.0 |
| Elongation (%) | 500 |
| Tensile (Mpa) | 7.7 |
| Tear (N/mm) | |
| Direction ⊥ to flow | 27 |
| Direction // to flow | 26 |

What is claimed is:

1. A thermoplastic elastomer vulcanizate comprising
   (a) about 15 to about 70% by weight of at least one thermoplastic torpolymer consisting essentially of about 2 to about 15% by weight of ethylene monomeric units, about 80 to about 96% by weight of propylene monomeric units, and about 15 to about 2% by weight of α-olefin monomeric units containing 4 to 8 carbon atoms, wherein the weight percent of said monomeric units is based on the total weight of said terpolymer, and
   (b) about 85 to about 30% by weight of at least one rubber component which has been fully cured with a non-peroxide curing system, such that no more than about 4% by weight of the curable rubber is extractable in cyclohexane at 23° C.,
   wherein the weight percent of said terpolymer and said rubber is based on the total weight of (a)+(b).

2. The thermoplastic elastomer vulcanizate of claim 1 additionally comprising up to about 65% by weight of additive (c), based on the total weight of (a)+(b)+(c), selected from the group consisting of fillers, plasticizers, antioxidants, stabilizers, compatibilizers, rubber processing oil, extender oils, lubricants, antiblocking agents, antistatic agents, waxes, foaming agents, pigments, flame retardants, processing aids and mixtures thereof.

3. The thermoplastic elastomer vulcanizate of claim 1 wherein the α-olefin in terpolymer (a) is selected from the group consisting of 1-butene, 1-pentene, 1-hexene and 1-octene.

4. The thermoplastic elastomer vulcanizate of claim 1 wherein the rubber is cured to the extent that no more than about 2% by weight of the curable rubber is extractable in cyclohexane at 23° C.

5. The thermoplastic elastomer vulcanizate of claim 1 wherein the curing system is selected from the group consisting of phenolic resin systems and hydrosilylation systems.

6. The thermoplastic vulcanizate of claim 1 wherein the rubber component is selected from the group consisting of EPDM rubber, EPM rubber, butyl rubber, halogenated butyl rubber, copolymers of a $C_{4-7}$ isomonoolefin and para-$C_{1-8}$-alkylstyrene or their halogenated derivatives, natural or synthetic rubber, polyisoprene, polybutadiene rubber, styrene-butadiene-copolymer rubber, nitrile rubbers and mixtures thereof.

7. A shaped article comprising the thermoplastic elastomer vulcanizate of claim 1.

* * * * *